(12) United States Patent
Gu

(10) Patent No.: US 10,274,797 B1
(45) Date of Patent: Apr. 30, 2019

(54) VOLTAGE-TUNABLE LIQUID CRYSTAL-BASED NOTCH FILTER AND METHOD OF FABRICATING

(71) Applicant: TELEDYNE SCIENTIFIC & IMAGING, LLC, Thousand Oaks, CA (US)

(72) Inventor: Dong-Feng Gu, Thousand Oaks, CA (US)

(73) Assignee: Teledyne Scientific & Imaging, LLC, Thousand Oaks, CA (US)

(*) Notice: Subject to any disclaimer, the term of this patent is extended or adjusted under 35 U.S.C. 154(b) by 2 days.

(21) Appl. No.: 15/830,942

(22) Filed: Dec. 4, 2017

(51) Int. Cl.
| | | |
|---|---|---|
| *G02F 1/133* | (2006.01) |
| *G02F 1/137* | (2006.01) |
| *G02F 1/1334* | (2006.01) |
| *G02F 1/1333* | (2006.01) |
| *G02F 1/1337* | (2006.01) |
| *G02F 1/1341* | (2006.01) |
| *G02F 1/1343* | (2006.01) |
| *G02F 1/1347* | (2006.01) |

(52) U.S. Cl.
CPC .......... *G02F 1/13471* (2013.01); *G02F 1/137* (2013.01); *G02F 1/1334* (2013.01); *G02F 1/1341* (2013.01); *G02F 1/13306* (2013.01); *G02F 1/13439* (2013.01); *G02F 1/133711* (2013.01); *G02F 1/133784* (2013.01); *G02F 1/134309* (2013.01); *G02F 2001/13345* (2013.01); *G02F 2001/133302* (2013.01); *G02F 2201/121* (2013.01); *G02F 2203/07* (2013.01)

(58) Field of Classification Search
CPC ......... G02F 1/134309; G02F 1/133711; G02F 1/133784; G02F 1/13471; G02F 1/137; G02F 1/13306
See application file for complete search history.

(56) References Cited

U.S. PATENT DOCUMENTS

| | | | | |
|---|---|---|---|---|
| 2008/0088756 A1* | 4/2008 | Tseng | .................. | G02B 1/06 349/33 |
| 2014/0036183 A1* | 2/2014 | Asatryan | ................ | G02F 1/139 349/33 |
| 2014/0285703 A1* | 9/2014 | Kizu | ................... | G02F 1/13306 348/340 |
| 2018/0059490 A1* | 3/2018 | Chen | ................ | G02F 1/133345 |

* cited by examiner

*Primary Examiner* — Jia X Pan
(74) *Attorney, Agent, or Firm* — M. J. Ram and Associates

(57) ABSTRACT

A method of fabricating a voltage-tunable liquid crystal-based notch filter requires filling at least two LC cells with cholesteric LC material to create LH and RH LC cells while applying heat to the cell substrates such that their temperatures are raised to near, but below, the clearing point, such that the LC material remains in the cholesteric state. An AC voltage is applied and turned off repeatedly while the LC cells cool down to room temperature, to cause the LC molecules to temporarily deviate from their intrinsic helical alignment. The cells are passed under a UV light sufficient to create cross-linked polymer networks, and self-compensation is used to compensate for in-band retardation. The resulting LH and RH LC cells are stacked such that the electrodes on adjacent substrates are connected to form a common electrode.

25 Claims, 4 Drawing Sheets

VOLTAGE-TUNABLE LIQUID CRYSTAL-BASED NOTCH FILTER AND METHOD OF FABRICATING

BACKGROUND OF THE INVENTION

Field of the Invention

This invention relates generally to liquid crystal-based filters, and more particularly to voltage-tunable liquid crystal-based notch filters and methods of fabricating such filters.

Description of the Related Art

Optical filters are widely used when there is a need to attenuate certain wavelengths of light; such filters would typically be placed in front of an imaging device. In some applications, it is desirable that the filter be tunable, such that the range of wavelengths being attenuated can be varied.

One type of tunable optical filter is made from a stack of cholesteric liquid crystal (LC) cells. The filter is tuned by varying the voltage applied across the stack. However, there are a number of factors which can degrade the optical density (OD) performance (given by $-\log_{10}(T)$, where T is transmission) of such filters. For example, localized alignment defects in the cholesteric LC cells can degrade OD. Such filters can also suffer from in-band retardation (due to the birefringence layers near the LC cell surface), which can lead to light leakage and a reduced OD.

SUMMARY OF THE INVENTION

A novel voltage-tunable LC-based notch filter and a method of fabricating the filter are presented. The present method serves to suppress localized alignment defects and reduce in-band retardation, thereby improving the filter's optical density (OD) performance.

The fabrication method requires:
  filling at least two LC cells, each comprising a pair of substrates, with cholesteric LC material to create a left-hand (LH) cell and a right-hand (RH) cell while applying heat to the substrates of the LC cells, such that their temperatures are raised to near, but below, the clearing point, such that the LC material remains in the cholesteric state, each of the substrates supporting respective electrodes;
  removing the LC cells from the heat;
  while the LC cells are cooling down to room temperature, applying and turning off repeatedly an AC voltage across the filled LC cells, with a voltage sufficient to cause the LC molecules to temporarily deviate from their intrinsic helical alignment;
  passing the LC cells under an ultraviolet light sufficient to create cross-linked polymer networks in the LC cells;
  compensating for in-band retardation by using self-compensation for the LH and RH LC cells; and
  stacking the LH and RH LC cells such that the electrodes on adjacent substrates are connected to form a common electrode, such that the LC cells form a LC-based notch filter which is tuned by applying a DC voltage across the LC cells.

The self-compensation step preferably comprises having the LC surface alignment directions or polyimide rubbing directions of the inner surfaces of the LH and RH cells be perpendicular to each other. The DC voltage is preferably applied such that the voltage applied on the inner surfaces of the two LC cells (preferably connected together to form an "inner electrode") that are closest to each other (40 and 48 in FIG. 2) have the same polarity, and the helical pitch contraction occurs near the inner electrode, rather than near the inner surfaces of the two cells that are facing outward (outer electrodes, 38 and 46 in FIG. 2). As used herein, a "helical pitch" is the distance it takes for the LC molecule's orientation to undergo a 180 degree rotation (56 in FIG. 2). An example is that if the majority of ions trapped in the polymer network are of a negative nature, the positive voltage is applied to the inner electrode, and the common (ground) electrode would be on the outer surfaces of the two LC cells.

These and other features, aspects, and advantages of the present invention will become better understood with reference to the following drawings, description, and claims.

DETAILED DESCRIPTION OF THE INVENTION

Figure 1:
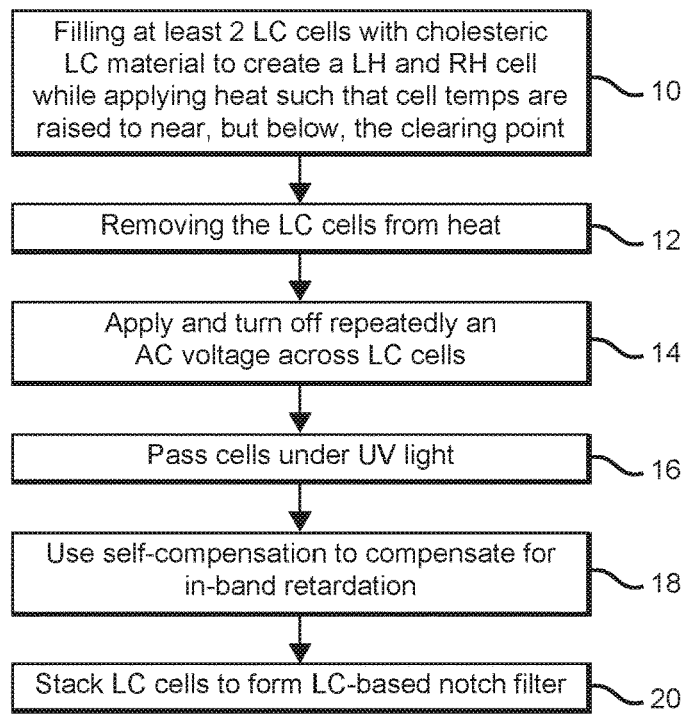
FIG. 1 is a flow diagram illustrating the basic steps associated with one possible version of the present LC-based notch filter fabrication method.

One possible method of fabricating a voltage-tunable LC-based notch filter in accordance with the present invention is shown in FIG. 1. The first step (10) requires filling at least two LC cells, each comprising a pair of substrates, with cholesteric LC material to create a left-hand (LH) cell and a right-hand (RH) cell. This step is performed while applying heat to the substrates of the LC cells, such that their temperatures are raised to near, but a few degrees Celsius below, the clearing point, such that the LC material remains in the cholesteric state. Each of the substrates preferably supports a respective electrode.

In step 12, the LC cells are removed from the heat. While the LC cells are cooling down to room temperature, an AC voltage is applied and turned off repeatedly across the filled LC cells (14), with a voltage sufficient to cause the LC molecules to temporarily deviate from their intrinsic helical alignment. The timing of the turning on and off of the AC voltage is not critical—a cycle of several seconds on followed by several seconds off, until the cells cool to near room temperature, is typically sufficient.

The LC cells are next passed under an ultraviolet light sufficient to create cross-linked polymer networks in the LC cells (16). The method then requires compensating for in-band retardation by using self-compensation for the LH and RH LC cells (18).

The LH and RH LC cells are then stacked, such that the inner electrodes on adjacent inner substrates are connected to form a single inner electrode (20), such that the LC cells form a LC-based notch filter which is tuned by applying a DC voltage across the LC cells.

When the cholesteric LC material is filled into the cells, the flow can create a "memory effect" that may be counter to the rubbing direction. The presence of spacers and particulates in the cells can also cause streaks to impact adequate molecular alignment. Applying heat to the substrates of the LC cells while they are being filled (in step 10) reduces the impact of flow to the initial alignment on the anchoring surface, thereby reducing the memory effect. Note that in common practice, people in the art quite often fill non-chiral LC mixtures into LC cells in their isotropic state (beyond the clearing point), but if the temperature is too high, the monomers can polymerize under the heat, creating a network that is not in line with the helical orientation of a cholesteric molecular profile. The thickness of a cholesteric cell used in a filter stack usually is much thicker than the helical pitch (56 in FIG. 2) to achieve high OD. Typically, a pitch-tunable cholesteric cell contains more than 15 helical pitches. Theoretically, the higher number of helical pitches, the higher OD a tunable filter can have. But in practice when the number of helical pitches is too high, the negative impact of alignment defects becomes significant. Therefore, there would be an optimized cell thickness depending on the material properties of the LC and the alignment layer such as birefringence, elastic constants, and anchoring strength. The other reason for not filling the LC mixture in its isotropic state is that when cooling from above the clearing point, the helical pitch around the isotropic to nematic transition will experience a drastic change, inducing many tiny domains and alignment defects that are difficult to suppress. Using an AC voltage as described above (step 14) while the LC cells are cooling down tends to "shake" the LC molecules, and thereby help them overcome localized alignment defects.

Self-compensation (step 18), i.e. as a pair, have the rubbing directions of the LH and RH LC cells perpendicular to each other), reduces in-band retardation. More generally, the self-compensation step comprises having the LC surface alignment directions or polyimide rubbing directions of the inner surfaces of the LH cell and the RH cell closest to the inner electrode be perpendicular to each other. The reason behind this arrangement is that if the in-band retardation near one surface is $\phi$, the in-band retardation near the adjacent inner electrodes would be very close to an equal amount but with a negative sign ($-\phi$), because they have a common voltage polarity and orthogonal alignment directions. Therefore, the two retardation quantities cancel each other out, and the total retardation when the beam passes the middle region of the filter is close to zero. If the amount of retardation is substantial when the beam passes the first cell and enters the bulk of the cholesteric medium in the second cell, the beam is no longer a perfect circularly polarized beam. The change in the ellipticity caused by the retardation would result in leakage and lower filter OD.

Figure 2:
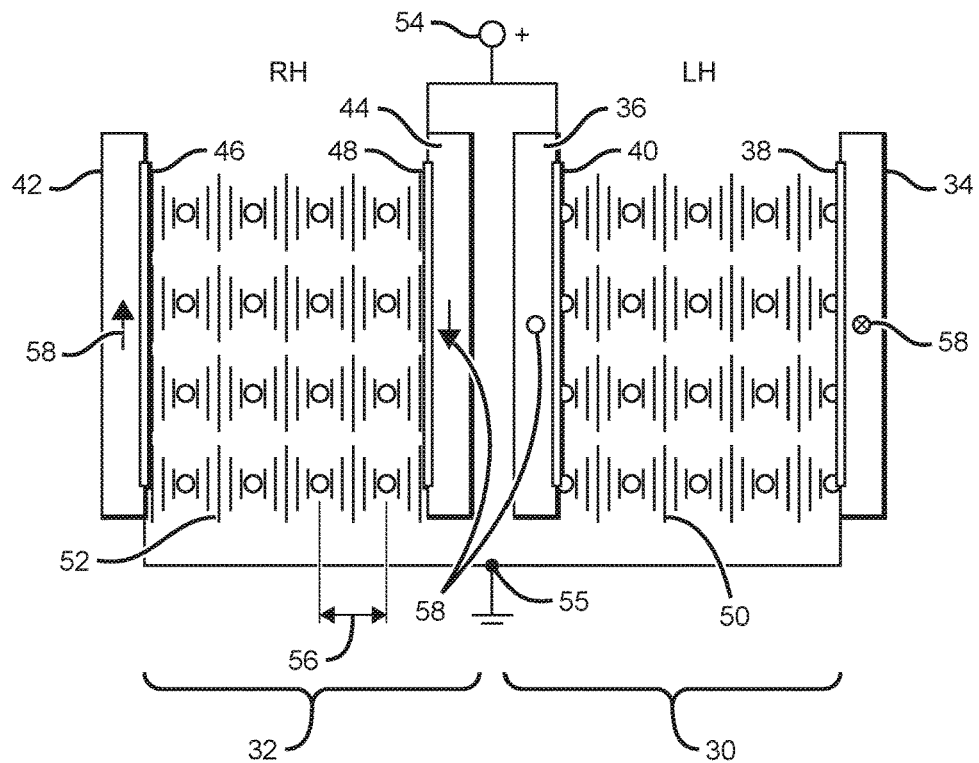
FIG. 2 is a diagram illustrating the structure of one possible embodiment of the present LC-based notch filter.

In-band retardation can be further reduced by arranging the polarity of a DC electric field applied to the individual LC cells such that, in a filter pair, the polarity of the voltage is always applied so that near the inner electrodes (i.e., 40 and 48 in FIG. 2, the "inner electrode"), the helical pitch becomes shorter than the pitch near the two outer surfaces (38 and 46 in FIG. 2). That is, if the trapped ions on the polymer network are of negative type, the DC voltage should be applied such that the voltage applied on the inner electrode is positive with respect to the voltage applied to the outer electrodes on the opposite sides of the cells from their interface. This measure can make the birefringence amplitude and its variation smaller near the interface between the LH and RH LC cells so the in-band retardation is substantially suppressed.

The filling of at least two LC cells with cholesteric LC material to create LH and RH cells (step 10) is preferably accomplished using capillary force. The heat applied in step 10 is suitably provided by a heat source, such as a hotplate or a temperature oven with a preset temperature close to but below the clearing point of the cholesteric medium of the LC cells. The cholesteric LC material preferably contains photopolymerizable liquid crystal monomers, the concentration of the monomers in the LC material being in a range of from 5% to 15%.

The AC voltage applied in step 14 is suitably in the range of 50-150 VAC. The frequency of the AC voltage is suitably in the range of 10 Hz-100 kHz.

Additional LC cells can be added to the notch filter by stacking one or more additional LC cells with the "at least two" LH and RH LC cells referenced in step 10. Adding additional LC cells in this way serves to increase the filter OD.

The additional LC cells should have the handedness of their cholesteric medium opposite to that of their neighboring cells. In addition, for each of the additional LC cells, the LC alignment direction near the cell's inner electrode should be perpendicular to the LC alignment direction near the outer electrode of the cell's neighboring LC cell. It is further noted that, for each of the additional LC cells, the DC voltage polarity of the voltage applied to the cell's inner electrode should be the same as that applied to the outer electrodes of the two cells (38 or 46 in FIG. 2).

One possible embodiment of a voltage-tunable liquid crystal-based notch filter in accordance with the present invention is shown in FIG. 2. The filter comprises a LH LC cell 30 and a RH LC cell 32. The LH LC cell 30 comprises a pair of substrates 34, 36 which support respective electrodes 38, 40 (for simplicity. the alignment layer coated on the electrodes is not shown). Similarly, RH LC cell 32 comprises a pair of substrates 42, 44 which support respective electrodes 46, 48. The filter's LC material, preferably cholesteric LC material, is in the form of twisted LC molecules 50 between LH LC substrates 34 and 36, and twisted LC molecules 52 between RH LC substrates 42 and 44.

The LH and RH cells 30 and 32 are treated as described above to reduce alignment defects. In addition, the rubbing directions of the LH cell and the RH cell are preferably perpendicular. Each cell also includes a plurality of polymer networks (not shown). The LH and RH LC cells 30 and 32 are stacked as shown, such that the electrodes on adjacent substrates (40, 48) are connected to a single node 54. The resulting structure is such that the stacked LC cells form a LC-based notch filter; additional LC cells (not shown) could be stacked with cells 30 and/or 32 as needed for a given application.

The filter is tuned by applying a DC voltage across the LC cells, between node 54 and a second node 55 connected to electrodes 38 and 46. This affects the helical pitch 56 in both cells and thus the range of wavelengths passed by the notch filter. It has been reported that the interactions between the trapped ions in the polymer network and the DC electric field lead to the pitch change (see, e.g., Hossein Nemati et al., Soft Matter, 2015, 11, 1208, "Mechanism of electrically induced photonic band gap broadening in polymer stabilized cholesteric liquid crystal with negative dielectric anisotropies"). The polymer networks in the cells are essential to make the pitch of the cells vary with the applied voltage—and thus make the filter tunable.

Electrodes 38, 40, 46, and 48 are preferably transparent conductive film, such as indium tin oxide (ITO), zinc oxide (ZnO), or other metal oxides. Each electrode may be coated with a layer of polyimide (or some other alignment material such as photo-alignment layers) as an alignment layer. Substrates 34, 36, 42, and 44 are preferably made of materials which are transparent for the wavelength range of interest. Sapphire is one such suitable material.

Note that it is the polyimide (or equivalent) that is rubbed to establish the "rubbing direction" referenced herein (as indicated as 58 in FIG. 2). Due to the rubbing, the liquid crystal molecular alignment direction near the alignment layer surface follows the rubbing direction. Other techniques, such as a UV photo-alignment technique, might alternatively be used to induce the alignment effect.

Figure 3A:
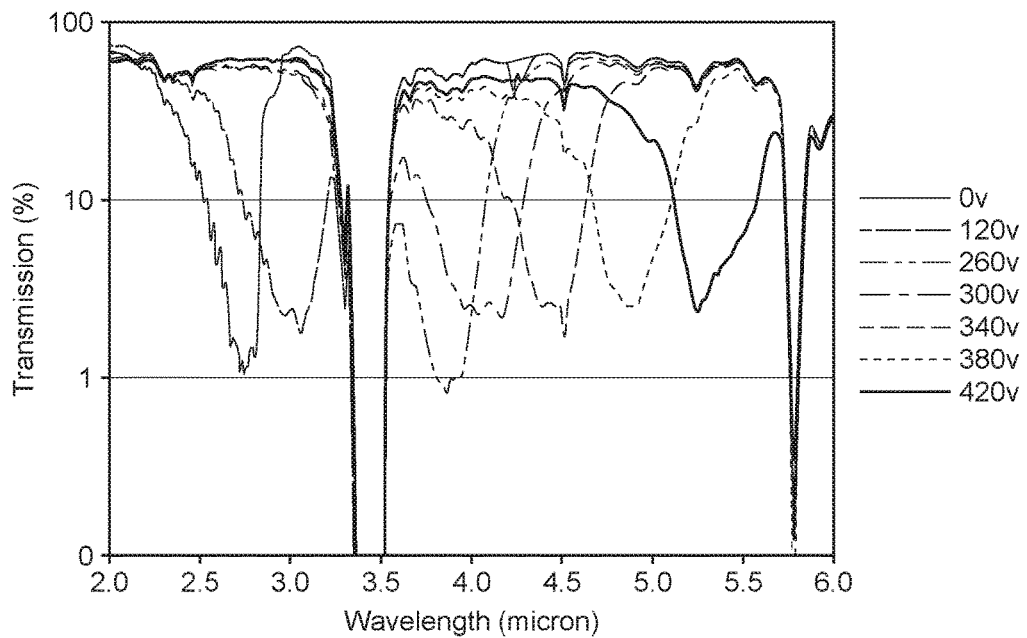
FIG. 3a is a graph of wavelength vs. transmission (%) in log scale for a LC-based notch filter per the present invention, when operated with an E-field applied in a non-preferred direction.
Figure 3B:
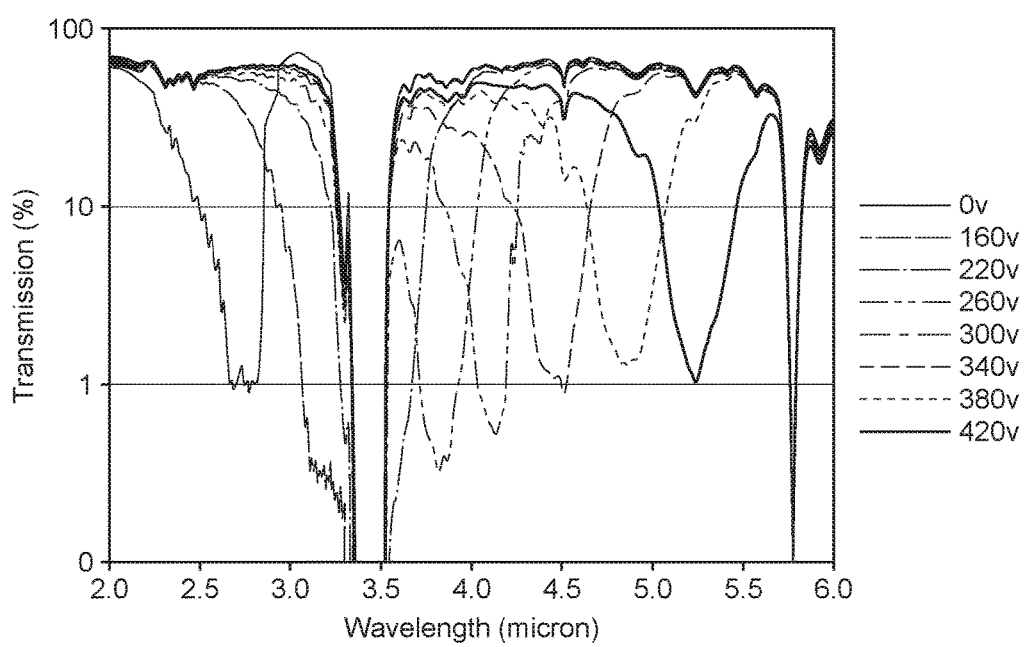
FIG. 3b is a graph of wavelength vs. transmission (%) in log scale for a LC-based notch filter per the present invention, when operated with an E-field applied in a preferred direction.

If the ions on the polymer network are dominantly negative, the DC tuning voltage is preferably such that the positive voltage is applied to the node 54, as illustrated in FIG. 2. This arrangement results in the creation of an E-field across the cell gap. The influence of pitch change and the preferred voltage polarity on the filter transmission spectrum is illustrated in FIGS. 3a and 3b, in log scale. FIG. 3a is a graph of wavelength vs. transmission (%) at several DC tuning voltages for a LC-based notch filter per the present invention when exposed to an E-field with positive polarity on the node 55. FIG. 3b is a graph of wavelength vs. transmission (%) at several DC tuning voltages for a LC-based notch filter per the present invention when exposed to an E-field with positive polarity on the node 55. OD is clearly improved when the E-field is properly applied, especially for the longer wavelengths. The difference between FIG. 3a and FIG. 3b is due to the fact that the total residual retardation near the inner electrodes 40 and 48 is more reduced in FIG. 3b. The filter is preferably arranged such that, when tuning, the DC voltage applied on the inner electrode has a polarity adequate to reduce the amplitude and variation of residue retardation of boundary layers near the inner electrodes. Specifically, when a DC voltage is applied to a cholesteric cell, due to the interaction between the trapped ions in the polymer network and the E field, the helical pitches in the middle region of the cell will become longer, and the pitches near the two opposing surfaces will either further extend or contract depending on the polarity of the E filed at the surface and the type of the ions trapped in the polymer network. For example, if the ions are negative and the polarity at surface A is positive, the pitches near it would be much shorter than that in the middle region of the cell and the pitches near the opposite surface would be longer. According to published results (see, e.g., Yo Inoue et al, Adv. Optical Mater., 2013, 1, 256, "Deformation-Free, Microsecond Electro-Optic Tuning of Liquid Crystals"), the amplitude and variation of the residue retardation near surface A would be smaller than that at the opposing surface. Therefore, using surface A as the inner electrode for a pair of cholesteric cells would have less leakage or higher OD due to more complete cancellation of the residue retardation.

Figure 4A:
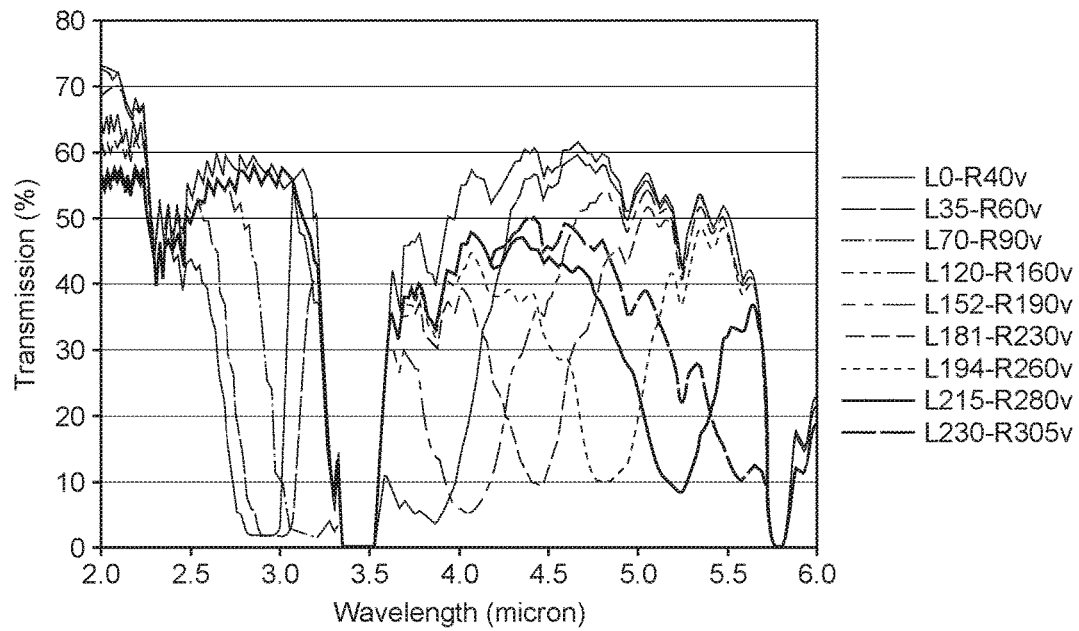
FIG. 4a is a graph of wavelength vs. transmission (%) in linear scale for a conventional LC-based notch filter.
Figure 4B:
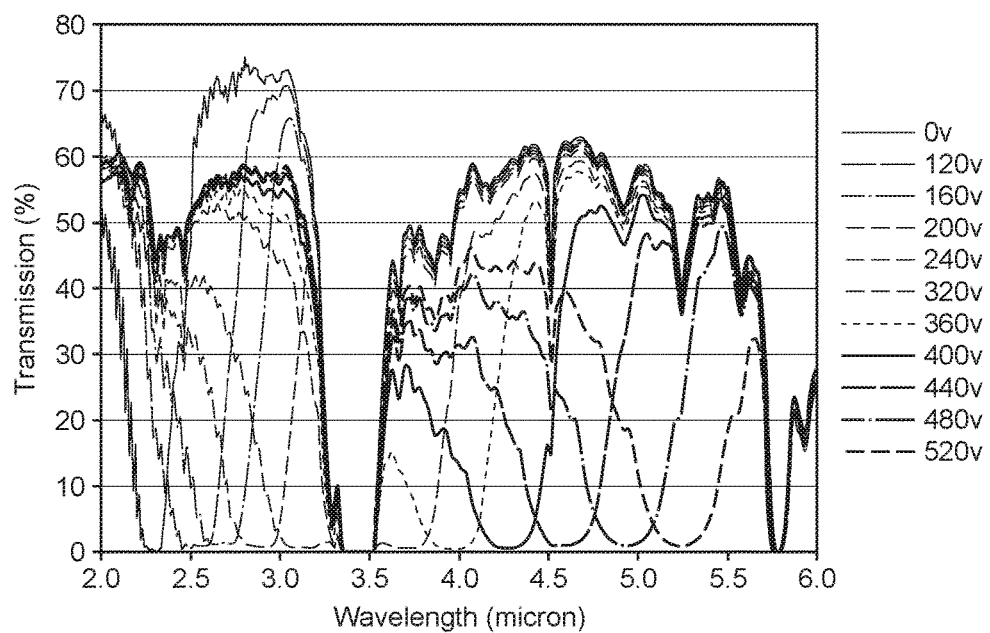
FIG. 4b is a graph of wavelength vs. transmission (%) in linear scale for a LC-based notch filter per the present invention.

The improvement in OD made possible by the present invention is also illustrated in the graphs shown in FIGS. 4a and 4b, in linear scale, which depict wavelength vs. transmission (%) at several DC tuning voltages for a LC-based notch filter with no preferred treatment (FIG. 4a), and a LC-based notch filter per the present invention (FIG. 4b). In FIG. 4a, it is clear that OD becomes lower when a conventional filter is tuned to the longer wavelengths (here, 3.5 μm-6 μm). In contrast, in FIG. 4b, it is seen that the OD over the same wavelength range consistently approaches the ideal value of 0. It has been demonstrated that the present LC-based notch filter can cover the entire MWIR region with an OD better than 2.0.

Figure 5:
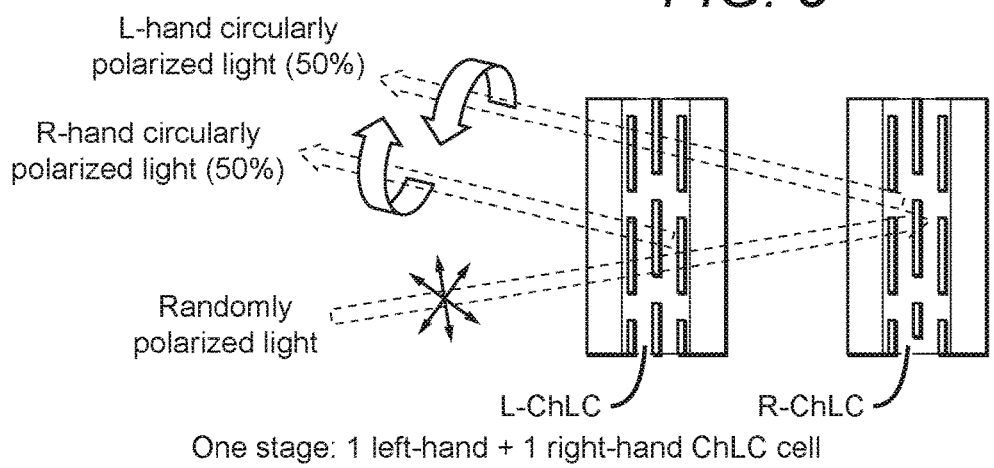
FIG. 5 is a diagram illustrating the effect of a LH and a RH cholesteric LC cell on incoming unpolarized light.

The filter blocking mechanism for a LC-based notch filter in accordance with the present invention is illustrated in FIG. 5, which depicts one "stage" of such a filter—with one LH cholesteric LC cell and one RH cholesteric LC cell. FIG. 5 also shows the effect of each cell on incoming randomly polarized light.

Figure 6:
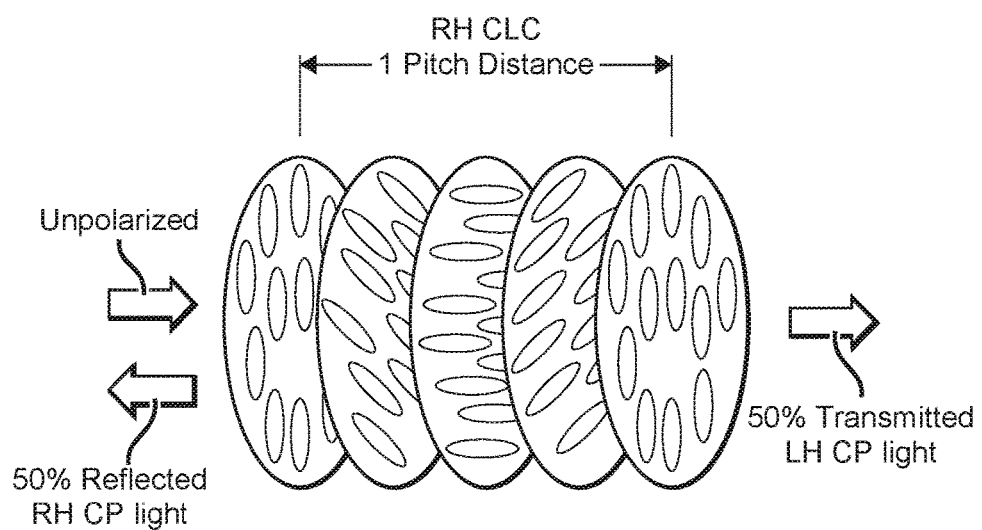
FIG. 6 is a diagram illustrating the effect of one RH cholesteric LC cell on incoming unpolarized light.

The polarization selective reflection aspect of the present LC-based notch filter is further elucidated in FIG. 6. In this illustration, one pitch of a RH cholesteric LC cell (RH CLC) is depicted, which here includes five representative LC molecular layers. When unpolarized light impinges on the cell, 50% will be reflected as RH circularly polarized (CP) light, and 50% will be transmitted as LH CP light. A LH CLC will perform similarly, with 50% of incoming unpolarized light being transmitted as RH CP light, and 50% being reflected as LH CP light. Note that in actual cholesteric cells used in a tunable filter, the number of helical pitches is typically much more than one (usually more than 15).

The voltage-tunable LC-based notch filter and fabrication method described herein can be used to fabricate notch filters for a wide range of wavelengths, including UV-visible, NIR, SWIR, and MWIR notch filters.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A method of fabricating a voltage-tunable liquid crystal-based notch filter, comprising:
    filling at least two liquid crystal (LC) cells, each comprising a pair of substrates, with cholesteric LC material to create a left-hand (LH) cell and a right-hand (RH) cell while applying heat to the substrates of said LC cells such that their temperatures are raised to near, but below, the clearing point, such that said LC material remains in the cholesteric state, each of said substrates supporting respective electrodes;
    removing said LC cells from said heat;
    while said LC cells are cooling down to room temperature, applying and turning off repeatedly an AC voltage across said filled LC cells with a voltage sufficient to cause the LC molecules to temporarily deviate from their intrinsic helical alignment and thereby suppresses the presence of alignment defects;
    passing said LC cells under an ultraviolet light sufficient to create cross-linked polymer networks in said LC cells;
    compensating for in-band retardation by using self-compensation for said LH and RH LC cells; and
    stacking said LH and RH LC cells such that the electrodes on adjacent substrates are connected to form a common electrode, such that said LC cells form a LC-based notch filter which is tuned by applying a DC voltage across said stacked LC cells using said electrodes.

2. The method of claim 1, further comprising applying said DC voltage with adequate polarity such that the contraction of the helical pitch occurs close to the inner surfaces of the LC cell stack.

3. The method of claim 1, wherein said using self-compensation comprises having the LC surface alignment directions or polyimide rubbing directions of the inner surfaces of said LH cell and said RH cell closest to the common electrode be perpendicular to each other.

4. The method of claim 1, wherein said electrodes comprise transparent conductive film such as indium tin oxide (ITO), zinc oxide (ZnO), or other metal oxides.

5. The method of claim 1, wherein said cholesteric LC material contains photo-polymerizable liquid crystal monomers, the concentration of said monomers in said LC material being in a range of from 5% to 15%.

6. The method of claim 1, wherein said substrates are made of materials which are transparent for the wavelength range of interest.

7. The method of claim 6, wherein said substrates are sapphire substrates.

8. The method of claim 1, further comprising providing a layer of polyimide on each of said electrodes as an alignment layer.

9. The method of claim 1, wherein said heat is applied with a heat source, said heat source comprising a hotplate or a temperature oven with a preset temperature close to but below the clearing point of the cholesteric medium of the LC cells.

10. The method of claim 1, wherein said filling comprises using capillary force.

11. The method of claim 1, wherein said AC voltage is 50-150 VAC.

12. The method of claim 1, wherein the frequency of said AC voltage is 10 Hz to 100 kHz.

13. The method of claim 1, further comprising including additional LC cells in said filter by stacking one or more additional LC cells with said LH and RH LC cells.

14. The method of claim 13, said additional LC cells having the handedness of their cholesteric medium opposite to that of their neighboring cells.

15. The method of claim 13, wherein, for each of said additional LC cells, the LC alignment direction near said cell's inner electrode is perpendicular to the LC alignment direction of the outer electrode of said cell's neighboring LC cell.

16. The method of claim 13, wherein, for each of said additional LC cells, the DC voltage polarity of the voltage applied to the electrode on said cell's inner electrode is the same as that applied to the outer electrode of said cell's neighboring LC cell.

17. The method of claim 1, wherein the thickness of each LC cell is at least 15 helical pitches.

18. A voltage-tunable liquid crystal-based notch filter, comprising:
   a left-hand (LH) liquid crystal (LC) cell and a right-hand (RH) LC cell, each of said cells comprising a pair of substrates with a LC material between the pair of substrates, each of said substrates supporting respective electrodes;
   said cells treated to reduce alignment defects and such that the rubbing directions of the LH cell and the RH cell are perpendicular; and
   a plurality of polymer networks in each of said LC cells;
   said LH and RH LC cells stacked such that the electrodes on adjacent substrates are connected to form an inner electrode, such that said LC cells form a LC-based notch filter which is tuned by applying a DC voltage across said LC cells using said electrodes.

19. The filter of claim 18, said filter arranged such that, when tuning, the DC voltage applied on said inner electrode has a polarity adequate to reduce the residue retardation of boundary layers near the inner electrodes, where the helical pitch becomes shorter.

20. The filter of claim 18, wherein said electrodes are transparent conductive film.

21. The filter of claim 18, wherein said electrodes comprise indium tin oxide (ITO), zinc oxide (ZnO), or other metal oxides.

22. The filter of claim 18, wherein each of the substrates of said LC cells is a sapphire substrate.

23. The filter of claim 18, further comprising a layer of polyimide on each of said electrodes.

24. The filter of claim 18, wherein said LC material is a cholesteric LC material.

25. The filter of claim 18, further comprising additional LC cells stacked with said LH and RH LC cells.

* * * * *